Jan. 10, 1933. M. MERRITT 1,893,841

RETURN BEND FOR PIPE COILS

Filed Jan. 4, 1930

INVENTOR.
Malcolm Merritt.
BY Jesse P. Langley
ATTORNEY.

Patented Jan. 10, 1933

1,893,841

UNITED STATES PATENT OFFICE

MALCOLM MERRITT, OF FORT WAYNE, INDIANA, ASSIGNOR TO THE WESTERN GAS CONSTRUCTION COMPANY, A CORPORATION OF INDIANA

RETURN BEND FOR PIPE COILS

Application filed January 4, 1930. Serial No. 418,614.

This invention relates to pipe coils and particularly to return bends for heat exchangers of the straight tube type. Return bends are used for joining the ends of parallel pipes. Such pipes are often arranged in tiers one above the other and may be used as a cooling coil or a heating coil.

Prior practice made use of an ordinary threaded U-shape return bend with which the threaded ends of the pipe made a screw joint. This construction was quite expensive and prevented access to any pipe which might be corroded or obstructed unless a considerable portion of the construction were disassembled.

Another previous method utilized a vertical header similar to a water tube steam boiler header and the ends of the parallel pipes forming the coil were rolled or expanded into the header. This construction also was very expensive.

An object of the present invention is the avoidance of the expensive threading or rolling of the pipes and my invention comprises the employment of a simple groove near the end of each pipe and a split collar having an inwardly extending annular projection for engaging the groove.

Each split collar serves as the exterior of a stuffing gland while the end of the pipe serves as the interior of the same and a short curved pipe extends from one stuffing gland to the next adjacent one. Bolts hold the curved pipe in assembled relation with the split collars and also compress the packing in the glands.

A coil comprises a plurality of superposed parallel horizontal pipes 1 arranged, for example, in a vertical plane. Their supports are not shown.

The ends of pairs of adjacent pipes 1 are connected by curved pipes 2 that are bent through an angle of 180°. Split collars 3 hold the curved pipes 2 in assembled relation with the ends of the long straight pipes and also serve to make the joint fluid tight.

Figure 2:
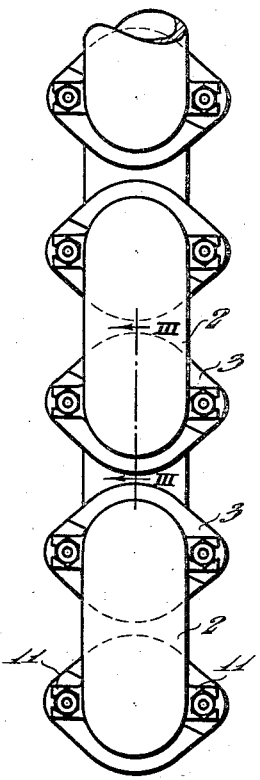
Fig. 2 is an end elevation of the portion of the coil.
Figure 1:
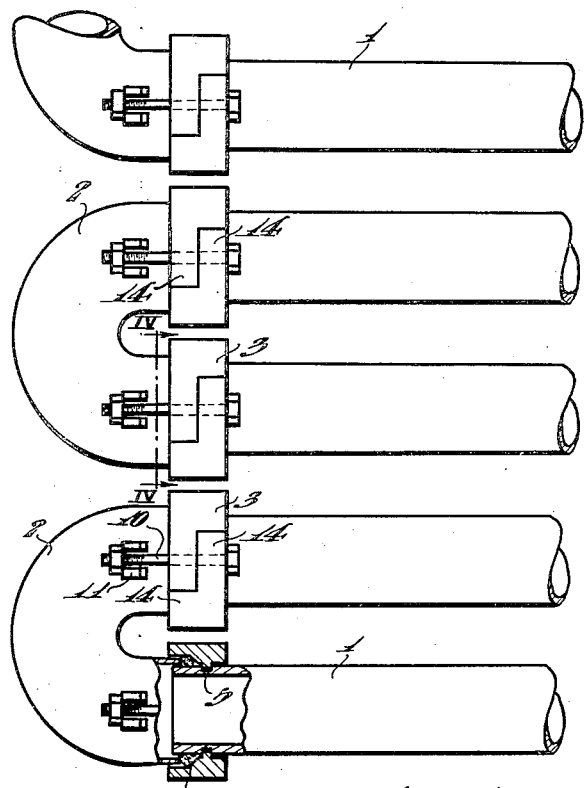
Figure 1 is a side elevation partly in cross-section of part of a coil provided with the improved return bend.
Figure 4:
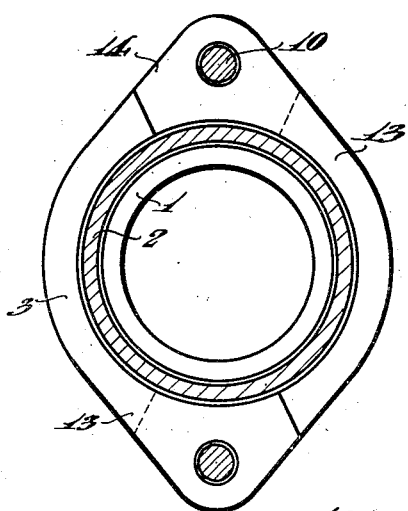
Fig. 4 is an enlarged cross-section turned through 90° taken through one branch of a return bend on line IV—IV of Fig. 1.
Figure 3:
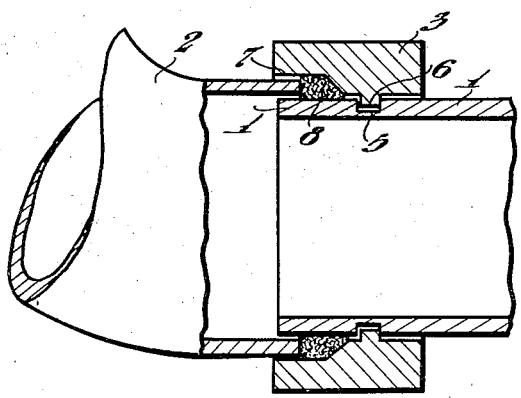
Fig. 3 is an enlarged cross-section taken through a split collar on line III—III of Fig. 2.

Grooves 5 are cut near the end of each straight pipe as shown in Fig. 3. Each split collar is provided with an inwardly extending annular projection 6 for engaging the groove 5.

Each split collar is provided with a recess 7, the inside diameter of which equals the outside diameter of the curved pipe 2. The inside diameter of the curved pipe 2 equals approximately the outside diameter of the pipe 1. The space between the end of the curved pipe 2 and the inner end of the recess 7 forms a stuffing gland 8.

Bolts 10 pass through each split collar 3 and by means of lugs 11 on the sides of the curved pipe or 180° bend 2, draw the ends of the curved pipe or casting 2 toward the inner end of the recess 7, thereby compressing the packing material in the stuffing gland 8 against the sides of the tube 1 and making a fluid-tight joint.

One curved pipe 2, two split collars 3, four bolts 10 and two rings of stuffing gland material 8 constitute one "return bend".

Each collar 3 is composed of two exactly similar halves 13.

Each half 13 is provided with two overlapping portions 14 that are one-half of the width of the collar. The two overlapping portions 14 for each half are in different planes.

The bolts 10 serve another function besides compressing the packing in gland 8. They pass through the overlapping portions 14 and hold the halves 13 of the collars 3 together in assembled relation and keep the annular projections 6 in the grooves 5 of the tubes.

Advantages of my invention are that no work need be done on the end of the pipe except the cutting of a simple groove. The dimensions of the groove and its distance from the end of the pipe need not be as accurate as is necessary to form a fluid tight joint, for example. The accuracy required is merely that needed for assembling purposes and the joint is made fluid tight by means of the gland 8.

Manufacture of the split collars is simplified because the two halves of each collar are interchangeable, and assembling of the collars on the pipes is easy because the grooves need only be cut with moderate accuracy.

I claim as my invention:

1. Apparatus comprising a pipe having a groove near the end thereof, a collar having a projection for engaging the groove, a recess in the collar, a member surrounding the pipe and extending into said recess and means for drawing the collar and member toward each other, said collar comprising overlapping segments and said means serving to hold the overlapping segments in assembled relation.

2. Apparatus comprising a pipe having a groove near the end thereof, a plurality of overlapping segments surrounding the pipe and engaging said groove, a curved pipe having an end that surrounds the end of the first-named pipe, said segments having a recess for receiving said end of the curved pipe and bolts passing through the overlapping portions of adjacent segments for holding them in assembled relation and for engaging the curved pipe for drawing it toward the segments.

3. Apparatus comprising a pipe having a groove near the end thereof, two semi-circular segments surrounding the pipe and engaging the groove, a curved pipe having an end that surrounds the end of the first-named pipe and said segments having a recess for receiving the end of the curved pipe, and common means for retaining said segments in said groove and for drawing said pipes toward each other.

In testimony whereof, I have hereunto subscribed my name this 2nd day of January, 1930.

MALCOLM MERRITT.